(12) United States Patent
Ranka et al.

(10) Patent No.: US 8,260,663 B1
(45) Date of Patent: Sep. 4, 2012

(54) METHOD, ALGORITHM, AND COMPUTER PROGRAM FOR TARGETING MESSAGES INCLUDING ADVERTISEMENTS IN AN INTERACTIVE MEASURABLE MEDIUM

(75) Inventors: Sanjay Ranka, Cupertino, CA (US); E. Diane Chang, Mountain View, CA (US); Daniel Veiner, Mountain View, CA (US)

(73) Assignee: Carl Meyer, Saratoga, CA (US)

( * ) Notice: Subject to any disclaimer, the term of this patent is extended or adjusted under 35 U.S.C. 154(b) by 2667 days.

(21) Appl. No.: 10/017,074

(22) Filed: Dec. 7, 2001

(51) Int. Cl.
*G06F 17/60* (2006.01)
*G06F 13/00* (2006.01)
*G06F 19/00* (2011.01)

(52) U.S. Cl. ............... 705/14.49; 705/14.4; 705/14.43; 705/14.66; 705/26.1; 709/219; 709/223; 709/224

(58) Field of Classification Search ............... 705/10, 705/14, 7.33, 14.4, 14.49, 14.43, 14.66, 26.1; 707/102; 379/266.08; 709/224, 219, 223
See application file for complete search history.

(56) References Cited

U.S. PATENT DOCUMENTS

| | | | |
|---|---|---|---|
| 5,617,538 A | | 4/1997 | Heller |
| 5,727,129 A | | 3/1998 | Barrett et al. |
| 5,809,481 A | | 9/1998 | Baron et al. |
| 5,848,396 A | * | 12/1998 | Gerace ................... 705/7.33 |
| 5,848,397 A | | 12/1998 | Marsh et al. |
| 5,873,068 A | | 2/1999 | Beaumont et al. |
| 5,884,305 A | | 3/1999 | Kleinberg et al. |
| 5,889,799 A | * | 3/1999 | Grossman et al. ....... 379/266.08 |
| 5,937,037 A | | 8/1999 | Kamel et al. |
| 5,937,392 A | | 8/1999 | Alberts |
| 6,055,573 A | * | 4/2000 | Gardenswartz et al. ...... 709/224 |
| 6,128,651 A | | 10/2000 | Cezar |
| 6,161,127 A | | 12/2000 | Cezar et al. |
| 6,182,059 B1 | | 1/2001 | Angotti et al. |
| 6,993,493 B1 | * | 1/2006 | Galperin et al. ............... 705/10 |
| 7,130,808 B1 | * | 10/2006 | Ranka et al. ................... 705/10 |
| 2001/0014868 A1 | * | 8/2001 | Herz et al. ..................... 705/14 |
| 2002/0035568 A1 | * | 3/2002 | Benthin et al. ............... 707/102 |
| 2003/0110080 A1 | * | 6/2003 | Tsutani et al. ................. 705/14 |

OTHER PUBLICATIONS

Gilbert G. Karuga, Andriy M. Khraban, Suresh K. Nair, Daniel O. Rice; AdPallette: an algorithm for customizing online advertisements on the fly; Decision Support Systems 32 (2001) 85-106.*

* cited by examiner

*Primary Examiner* — John Weiss
*Assistant Examiner* — Marilyn G Macasiano
(74) *Attorney, Agent, or Firm* — David H. Judson (57) ABSTRACT

Method, procedure, algorithm, system, and computer program and computer program product for improving and optimizing or attempting to optimize performance of messaging campaigns, particularly to marketing campaigns in which advertisements or other messages are distributed over an interactive measurable medium such as the Internet. When message is an advertisement, campaign involves a list of ad alternatives and a target customer population. Goal of message manager or marketing manager is to allocate ad alternatives to customer population to optimize business objectives such as maximizing the number of positive responses received. This is achieved at least in part by segmenting customer population into segments and then finding best allocation of ad alternatives for each segment. The number of segments and grouping of a customer population changes at different stages of the campaign. When the message is other than an advertisement, goal is to allocate messages to optimize analogous business or campaign objectives, typically measured by the number of successes or successful responses.

5 Claims, 6 Drawing Sheets

METHOD, ALGORITHM, AND COMPUTER PROGRAM FOR TARGETING MESSAGES INCLUDING ADVERTISEMENTS IN AN INTERACTIVE MEASURABLE MEDIUM

RELATED APPLICATIONS

U.S. patent application Ser. No. 09/586,394, filed Jun. 2, 2000 and entitled System and Method for Optimizing The Performance of Email and Other Splash Page Campaigns; U.S. patent application Ser. No. 09/586,387, filed Jun. 2, 2000 and entitled Method, Algorithm, and Computer Program for Optimizing the Performance of Messages Including Advertisements in an Interactive Measurable Medium; and U.S. patent application Ser. No. 09/586,393, filed Jun. 2, 2000 entitled System, Method and Operating Model for Optimizing The Performance of Messages In An Interactive Measurable Medium. U.S. Patent Application Ser. No. 60/173,689 filed Dec. 29, 1999 entitled Optimizing the Performance of Emails. Each of the above referenced patent applications are hereby incorporated by reference.

FIELD OF THE INVENTION

This invention relates generally to methods, algorithms, and computer software programs for optimizing the performance of advertisements and other messages or content, and more particularly to methods, algorithms, and computer software programs for optimizing the performance of advertisements, messages, and other content in an interactive measurable medium such as a global network of interconnected information devices and appliances, and most particularly to optimization of performance of banner ads presented on interne web sites.

BACKGROUND

This invention relates to method, procedure, algorithm, and computer program for improving and attempting to optimize the performance of marketing campaigns in which advertisements or other messages are distributed over an interactive measurable medium such as the Internet. When the message is an advertisement, the campaign involves a list of ad alternatives and a target customer population. The goal of the marketer is to allocate the ad alternatives to the customer population to optimize business objectives such as maximizing the number of responses received. When the message is other than an advertisement, the goal is to otherwise allocate messages to optimize analogous business message or other message campaign objectives, typically measured by the number of successes or successful responses. In this description, the term "ad" has the same meaning and is used interchangeably with the term "advertisement".

In large part due to the particular applicability of the invention to advertisements on the Internet, this background description focuses on Internet advertising to establish one context of the invention and to differentiate the invention from conventional systems and methods. It is to be understood however, that the invention is not to be interpreted to be limited only to an Internet advertising environment or to advertising environments alone no matter what the media, rather the invention pertains to a broad spectrum of message and messaging contexts in or on various interactive media.

Various systems currently exist for the delivery and tracking of advertisements on the Internet, for instance, ad servers for serving and tracking "banner ads" on a web page. The users of these ad delivery or ad server systems have access to data on the performance of all the ads on all the locations. This data is updated by the delivery and tracking system on a periodic basis. The users are also provided with an array of parameters to configure the delivery and tracking system. In a typical conventional situation, an advertiser buys advertising space (ad space) on a number of web sites. The advertising space buy on each web site consists of a number of categories. Such categories may correspond to different sections within that web site, where a section is a specific web page or a set of related web pages within the site. A category may also correspond to keywords searched by a customer on a search engine. The term "zone" will be used to represent a unique site and category combination. There may typically be a number of banners that an advertiser wishes to deploy across these zones. A banner is either a graphic image that announces the name or identity of a site or is an advertising image. An impression occurs when an Internet visitor sees a banner. A clickthrough occurs when a visitor to a zone clicks on a banner. This redirects the visitor to the page on the advertiser's web site.

The fraction of impressions that should be allocated to a particular banner alternative for a zone is an important parameter that the advertiser (or other messaging entity) can select and modify to boost the advertising campaign performance.

Impressions can occur at any time—whenever someone visits the appropriate page of a web site. However, the reports are typically updated at discrete times. We will call the intermediate time between two reports a stage. At the end of each stage, the results are available for that stage. In particular, the following information is available for each banner for a given zone: (1) the number of impressions delivered during a stage, and (2) the number of clickthroughs generated during a stage.

Additionally this information (that is, the number of impressions delivered during any particular stage or stages, and number of clickthroughs generated during any particular stage or stages, and the like) may be available separately for different characteristics of the visitor population. When a visitor arrives at a website, a variety of visitor profiling information may be available. This information may include, for example:

Data based on the current visit. Examples of this type of profiling information include the time of the visit, the type of browser used by the visitor, and the IP address.

Data based on an earlier visit. An example is data from a registration form that was filled out by the visitor on an earlier visit.

Data from external sources. For example, an external customer database may provide data on the purchase history of the visitor.

Profile information in each list above is exemplary and not intended to be exhaustive. The data for each profiling attribute provides an opportunity for customizing the ad banner or other message shown to each campaign visitor. By selecting different banners or other messages for different visitor profiles, the overall ad or message campaign performance can be improved.

In one embodiment, visitors can be classified into market segments based on this data. For example, segments based on age or income might be defined. The inventive method and algorithms can be used in conjunction with this type of market segmentation process. In particular, the invention can be applied to each segment independently. When a visitor arrives, he/she is assigned to a segment. Then the invention restricted to that segment is applied to the visitor.

This aspect of the invention relates to an algorithm to improve an advertising campaign's performance by dividing the space of customer population characteristics into multiple segments. Visitors belonging to one segment may, for example, be shown different ads or presented with different messages than visitors belonging to other segments. Segments may be identified based on measured response of visitors to different advertisements, messages, or other content.

Figure 4:
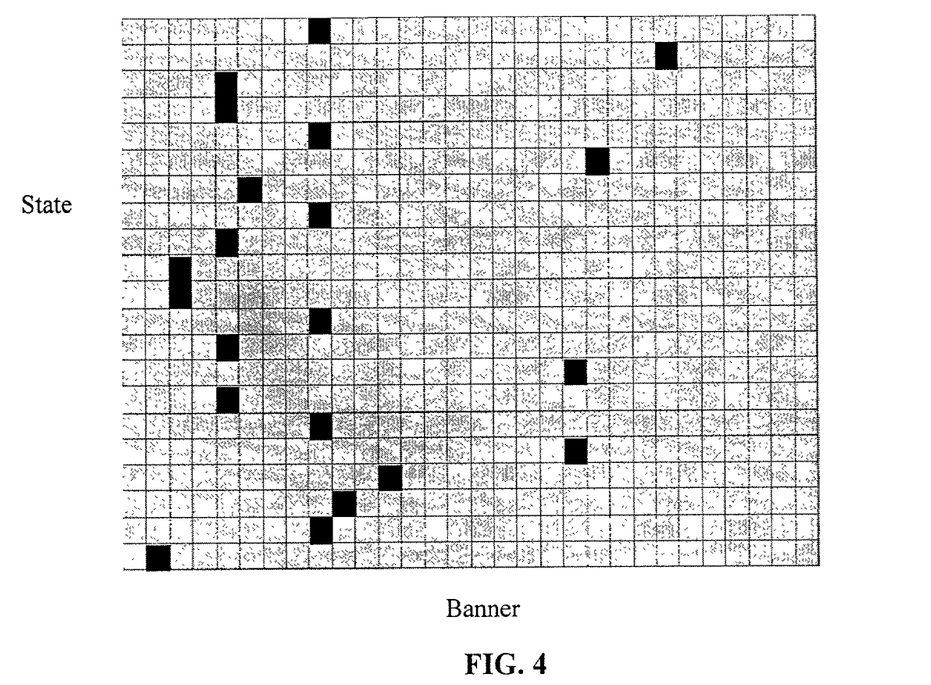
FIG. 4 is a diagrammatic illustration showing an example where the best banner to be shown for optimal performance varies by the geographical location of the visitor.

An exemplary scenario illustrating the opportunity to customize the ad or other message is now described by way of example. This exemplary data pertains to a test campaign involving thirty banners. This data is sorted by the home states of the visitors. Using this data, the click-through rate of each banner in each of twenty-one states is estimated. (In this particular test data scenario, too little data are available to estimate click-through rates for all thirty banners in the remaining states). Therefore, for each of the twenty-one states one can identify the banner that achieved the highest click-through rate. The results of this scenario are summarized as a matrix of State versus banner in FIG. 4. Here rows correspond to the twenty-one states and columns to the thirty banners. The best banner in each state is highlighted. This figure illustrates that in general, different banners are preferred in different states. In particular, no one banner is best in all the states (or even in half of the states). Yet, if one were to ignore the home states of the visitors during this campaign, one would be forced to serve the same set of banners in all states. In this example the improvement that can be obtained by using the best banner for each state as opposed to the best overall banner is approximately 60%. This suggests that one can obtain significant performance improvements by using visitor-profiling data.

Ad servers or message servers generate reports that provide information about the impressions and clicks for different banners for one or more visitor attributes. These reports are provided in printed form or in the electronic equivalent of printed form, and are manually analyzed by trained analysis personnel to derive new, improved advertisement configurations. For example, they are analyzed in an attempt to optimize the clickthroughs generated by a pool of banner alternatives for a given zone, a given frequency level, and the like configuration information. This manual process is tedious and error-prone and has an inherent delay between the period of data collection and the time new advertisements are to be placed because of the large amount of data to be analyzed and the large number of parameters to be modified. Even if errors are not made and the user is able to overcome the tedium of the process, it is unlikely to yield optimal or even near-optimal recommendations for advertisement configurations. This is especially true in light of the typical delay of from a day to a week that elapses between data collection, analysis, and a new or modified ad campaign based on the analysis in conventional systems and methods.

Optimization to provide an effective advertising campaign is in essence a multi-dimensional optimization problem but that involves much more, that by-and-large cannot be timely solved using conventional tools, methods, or systems. It is noted that these problems exist substantially independent of the type of advertisement or message, and that such issues and problems exist relative to advertisements for products and services, political campaigns, ballot measures and initiatives, media programming, lobbying, surveys, polling, news headlines, sports scores, as well as other directed marketing, promotions, surveys, news, information, other content generally, and the like.

Therefore, there remains a need for an automated system for optimizing allocation parameters for advertisement alternatives or message alternatives. There also remains a need for an automated system and method for rapidly and efficiently executing the optimized allocation parameters to place the advertisement or message on the Internet or other local or global communication system. More particularly there remains a need for an optimization procedure or algorithm that utilizes available message performance information (for example, ad performance information) and generates recommendations for maintaining good performance or for improving performance during a subsequent stage of the campaign or optimizing performance of the entire campaign.

There also remains a need for a system and method that can learn and optimize across the various other parameters that can be reconfigured in advertisement delivery systems also commonly referred to as ad servers. For example, there remains a need for an ad server system and method that permits an advertiser to display different banners (or other content or messages) based on a time-of-day user web browsing profile which may include geographic location information, demographic information, or the like, as well as other user targeting information.

There also remains a need for an operating model that provides the optimized allocations for banner ad alternatives or message alternatives automatically on an interconnected network of computers or other information devices or appliances without significant human intervention.

These and other needs in conventional systems and methods are solved by the inventive system and method, particularly by the inventive optimization method and algorithm and computer software implementations of the inventive optimization algorithm and method.

SUMMARY

The invention provides method, procedure, algorithm, system, and computer program for improving and attempting to optimize the performance of messaging campaigns, particularly to marketing campaigns in which advertisements or other messages are distributed over an interactive measurable medium such as the Internet When the message is an advertisement, the campaign involves a list of ad alternatives and a target customer population. The goal of the message manager or marketing manager is to allocate the ad alternatives to the customer population to optimize business objectives such as maximizing the number of positive responses received. This is achieved at least in part by segmenting the customer population into several segments and then finding the best allocation of the ad alternatives for each segment. The number of segments and the grouping of a customer population changes at different stages of the campaign. When the message is other than an advertisement, the goal is to allocate messages to optimize analogous business or campaign objectives, typically measured by the number of successes or successful responses.

The invention also provides method, procedure, algorithm, system, and computer program for segmenting a customer population based on the performance of advertisements or messages. The number of segments and the grouping of a customer population changes at different stages of the campaign, as more performance information is available.

An optimization procedure is implemented on a computer that is programmed to retrieve message performance information and to generate recommended message allocations for a next stage in a multistage messaging campaign to achieve messaging goals. A segmentation procedure is implemented on a computer that is programmed to retrieve message performance information and to generate segmentations for a next stage in a multistage messaging campaign to achieve messaging goals. In one aspect the invention provides a method for improving the stage-to-stage performance of a message in a multi-stage message campaign in an interactive measurable medium. In another aspect the invention provides a method for segmenting the target population into segments based on the underlying performance of different messages in the message campaign. The interactive measurable medium may be, for example, the Internet or other distributed set of interconnected computer or information appliances. The measurable quality of this medium lies in part on its ability to measure responses to messages of different types. The methods include reading the prior stage message state pertaining to a prior stage in a message campaign, where the prior stage message state includes a cumulative number of trials and a cumulative number of successes for a particular message at the end of the prior stage. The message performance results representing message trials and message successes from the previous stage based on the prior stage state are then read; and a current (or new) message state is computed on the basis of the prior stage message state and the message performance results. Finally, a current (or new or updated) message allocation and/or target population segmentation is generated based on the current message state. Normally, the newly determined current message state is stored as prior stage state for a next iteration of the procedure. Desirably, but optionally, the cumulative number of trials and the cumulative number of successes include discounted cumulative number of trials and discounted cumulative number of successes; and generating a current message allocation includes applying a message allocation constraint. These inventive procedures may be applied to various messages including for example, web site banner advertisements, electronic advertisements generally, email messages and promotions, and the like. In one embodiment, the messages are interne web site banner ads, trials are impressions of the ads presented to the user, and successes are measured by clickthroughs from the banner ad to the web site associated with the banner ad.

Computer system, computer program, and computer program product associated with the inventive method and procedures are also provided by the invention.

DETAILED DESCRIPTION OF THE EMBODIMENTS

The invention provides system, apparatus, method, computer program, and computer program product for monitoring and improving the performance of messages communicated over an interactive measurable medium, such as the Internet. The term optimizing is used to describe the attempt to improve performance though those workers having ordinary skill in the art will appreciate that while there may be only a single "optimum" which may not always be attained, there are many degrees of performance improvement that may be obtained. As used in this description, optimization conveniently means improvement rather than requiring attainment of any single optimum value as well as actually obtaining an optimum and identifying it as such. Put differently, optimization refers to procedures, algorithms, and other attempts to attain optimum performance rather than requiring that the optimum performance be attained.

Sectional headers provided in this description are provided merely for the purpose of assisting the reader in understanding where a primary description of a particular aspect of the invention is described. It is understood that aspects of the invention are described throughout the description, drawings, and claims and that the headers do not limit the description in any way.

The messages that are being optimized may be any type of message or communication and include by way of example but not limitation messages such as advertisements including web site banner ads, marketing campaigns, political campaigns, surveys, sales and promotions of various types, public service announcements, electronic mail or email, pop-up windows and the like. Usually, there will be several message alternatives.

In simplified terms, one embodiment of the invention provides an optimization system and procedure that selects (or selects more frequently) and utilizes one or more well performing message alternatives and deselects (or selects less frequently) poorer performing message alternatives from among the available message alternatives based on the past performance of at least some of the other message alternatives. However, recognizing that a particular message alternative's performance may change (improve or degrade) over time, in at least some embodiments of the invention, even poorer performing message alternatives may be allocated some share of the total number of messages to be sent. The inventive system and method are adaptive and learn continuously. In some embodiments, newer performance information is weighted more heavily than older performance information, and the manner in which this weighting function is applied is selectable and programmable as are many other aspects of the inventive procedure.

Among the many features that distinguish the inventive system and method from conventional ones, the invention provides a procedure that recommends and allocates messages to and among a plurality of different message alternatives at intervals of time. These intervals of time are referred to here as "stages" and though they may be any arbitrary intervals of time, the stages are desirably regular intervals of time. For example stages may be 6-hour intervals, 8-hour time intervals, 12-hour time intervals, one per day, one per week, or any other interval. Stages may have fixed length or variable length such that the end of one stage and/or the start of another stage may be triggered by the occurrence of an event or the absence of occurrence of an event. Usually, the intervals should be long enough to allow collection of significant performance data, and not so long that important short-term trends may be missed. In developing this recommendation and allocation, one embodiment of the inventive procedure uses the available performance or response data from all prior stages in the message campaign. In another embodiment, the performance or response data from prior stages may be discarded after a predetermined number of stages have passed or the performance or response data may be weighted to increase the contribution for recent data and discount the contribution for older data. In either case, the inventive procedure tries to maximize performance, which may be indicated by the total number of positive responses generated by the message set.

The performance of message, in general, depends on the characteristics of the target customer. To maximize performance, the inventive procedure spreads messages to all or most of the message alternatives, in the earlier stages, to discover high performing alternatives for different portions of the target population. The inventive procedure based on the information available segments the target population in several segments. Customers in a given segment are expected to have similar preferences among the messages. Within a segment, messages are sent to better performing messages. As more information is available about the performance of these message alternatives, a higher concentration of messages are sent to better performing message alternatives within a group, where better performing describes relative performance between the message alternatives sent.

The inventive procedure can also robustly handle reasonable fluctuations in the underlying performance of a message alternative without deteriorating performance significantly. This later characteristic is beneficial because performance of a message alternative may change over time due to seasonal fluctuations or other reasons. Empirical and heuristic evidence, including computer simulation, have demonstrated the effectiveness of the inventive procedure in improving performance over that achieved by simplistic allocation strategies. Some of these simplistic allocation strategies include, for example distributing the messages uniformly over all the different message alternatives or assigning most of the messages to the best performing message alternative up to that stage.

While the inventive system and method may be applied to various message types, the description below for purposes of illustration focuses on advertising messages, and web site banner ads in particular. The general principles, algorithms and procedures, and parameters described relative to banner ads apply as well to messages of other types in interactive measurable digital environments.

A marketing or ad campaign involves a list of ad alternatives (a particular type of message alternative) and a target customer population. The goal of the marketer is to allocate the ad alternatives to the customer population to optimize business objectives such as maximizing the number of responses received. In an embodiment of the invention directed to advertising, the invention provides procedure and algorithm for optimizing the performance of marketing campaigns in which advertisements are distributed over an interactive, measurable medium such as the Internet. One particular, popular type of advertisement is the Internet web site banner ad.

A banner ad, or more simply "banner," is an on-line ad the advertiser wants displayed at one or more zones. An advertiser buys ad space (advertising space) on at least one, but usually on a number of web sites for the banner. The ad buy on each site consists of a number of zones, where the zones may for example be different sections or locations within that site, or more generally locations anywhere on the entire network. We will use the term "zone" to specify a location at which a banner ad or other message can be displayed on a given page of a given Internet site. During a banner ad campaign, the advertiser pays to have banners shown at one or a collection of zones.

There are likely to be a number of banner ad alternatives that the advertiser wishes to deploy across these zones. For a given campaign, a marketer will provide a collection of banners that need to be assigned to the available impressions. The term "impression" is commonly used in the industry to refer to the occurrence of a banner ad on an Internet web site. A "click-through" occurs when a visitor to a zone clicks on a banner. Clicking-through a banner ad redirects the visitor to the page on the advertisers web site. Impressions occur when a user visits the appropriate page of a site where the banner is displayed. The term "message alternative" is used more generically for other message types, where a particular "message" is selected from available message alternatives. In an analogous manner, an "email" is selected from available "email alternatives," a "pop-up window" is selected from available "pop-up window alternatives," a "web page" is selected from available "web page alternatives," and a "web layout" is selected from available "web layout alternatives." Using this syntax, a "banner" is selected from "banner alternatives." The phrases "message impression," "email impression", and "web page impression" though being analogous to "banner impression" have not been adopted in the field, rather the terms "email", "message", and "web page" themselves correspond to the impression.

Reports providing information as to the performance of such banner ads are generated or updated at discrete times. The intermediate time between two reports is referred to as a stage. At the end of each stage, the ad performance results are available for that stage. In particular, ad performance indicators such as the number of impressions delivered and the number of clickthroughs are available for each banner at each zone.

The invention provides an automated system for optimizing ad allocation parameters and executing them on the Internet or other communication system or media. The invention can also be used to optimize across the various other parameters that can be selected and configured in ad delivery systems. For example, ad delivery systems may typically allow an advertiser to display different banners based on the time of the day, the profile of the user browsing the web site (for example, their geographic location and other demographic information), as well as other ad or marketing targeting criteria.

A marketing manager or other person responsible for directing the ad campaign may typically impose certain constraints on where or when certain banners may be displayed. For example, a given banner might be excluded from appearing at a specific zone during certain stages of the ad campaign. This type of constraint may reflect the fact that an advertiser's buy for one zone might cover different stages than the buy at another zone. Or, a particular banner may just not be appropriate for some zones. These are merely illustrative of the constraints that may be imposed and it will be clear to those workers having ordinary skill in the art that virtually any parameter or condition associated with placing ads may be constrained by the marketing manager or other responsible person. In the context of the inventive structure and method, the ability to constrain one or more ad campaign allocation parameters, conditions, or other attributes is desirable so that any constraints that might not normally be constrained by the optimization procedure are understood to be constrained and taken into account.

One embodiment of the inventive optimization method may find particular utility when utilized in conjunction with a system for optimizing the performance of messages, embodiments of which are described in co-pending U.S. patent application Ser. No. 09/586,393, filed Jun. 2, 2000 and entitled System, Method, and Business Operating Model for Optimizing The Performance of Messages In An Interactive Measurable Medium, which is hereby incorporated by reference. The inventive optimization method and algorithm may also be utilized in conjunction with a system and method for improving the performance of electronic mail and electronic mail systems, embodiments of which are described in U.S. patent application Ser. No. 09/586,394, filed Jun. 2, 2000 and entitled Optimizing The Performance of Email and Other Message Campaigns, which is hereby incorporated by reference. However, those workers having ordinary skill in the art in light of the description provided here will appreciate that the invention is not limited to these particular exemplary applications, The invention can learn and optimize across the various other parameters that are available for configuring message or ad server systems. For instance, ad server systems permit display of different banner ads based on the time of the day and the profile of the user browsing the web site (e.g. their geographic location and other demographic information), as well as other targeting criteria. The inventive optimizing system and method learn and then set the appropriate parameters across multiple dimensions so as to optimize the objective specified by the message provider, such as an advertiser.

Those workers having ordinary skill in the art in light of the description provided here will appreciate that the system as described above can be easily extended to be useful for optimizing other message types, including, for example, but not limited to: (1) email alternatives, (2) pop-up window alternatives, (3) web page alternatives, and (4) web layout alternatives.

In one aspect, the invention provides a system for optimizing ads or other messages in an interactive measurable medium and automating the configuration of an ad server system in a larger interactive medium, such as the Internet. The system includes an optimizing engine typically within a server of conventional type having a processor or CPU, a memory coupled to the processor, and a local data storage, along with input/output and other network communication devices for communicating data and commands to other computers or information appliances. The optimization engine that implements the inventive optimization procedure in software takes as input an ad performance report or other performance data and generates configuration parameters for the optimal allocation of ad alternatives. In one embodiment, it loads the performance reports from a database and stores the parameter values into the database. The database stores user-configured information, optimization engine generated configuration parameters and performance reports from the ad server system. An advertising server interaction service is operative to load performance reports from the ad server system and store them in the database as well as taking user or optimization engine generated settings and setting them into the ad server system. In the system implementation, the user interface allows the user to enter campaign data and specifications about the optimization. Additional features of such a system are described in U.S. patent application Ser. No. 09/586,393, filed Jun. 2, 2000 and entitled System, Method, and Business Operating Model for Optimizing The Performance of Messages In An Interactive Measurable Medium.

As the inventive method is advantageously implemented as a computer program and computer program product for use on a general (or special) purpose computer, such as for example a computer operating in an Internet or other network server environment, attention is now directed to an exemplary computer system which may be used in conjunction with the inventive method, procedure, computer program, and computer program product.

Figure 1:
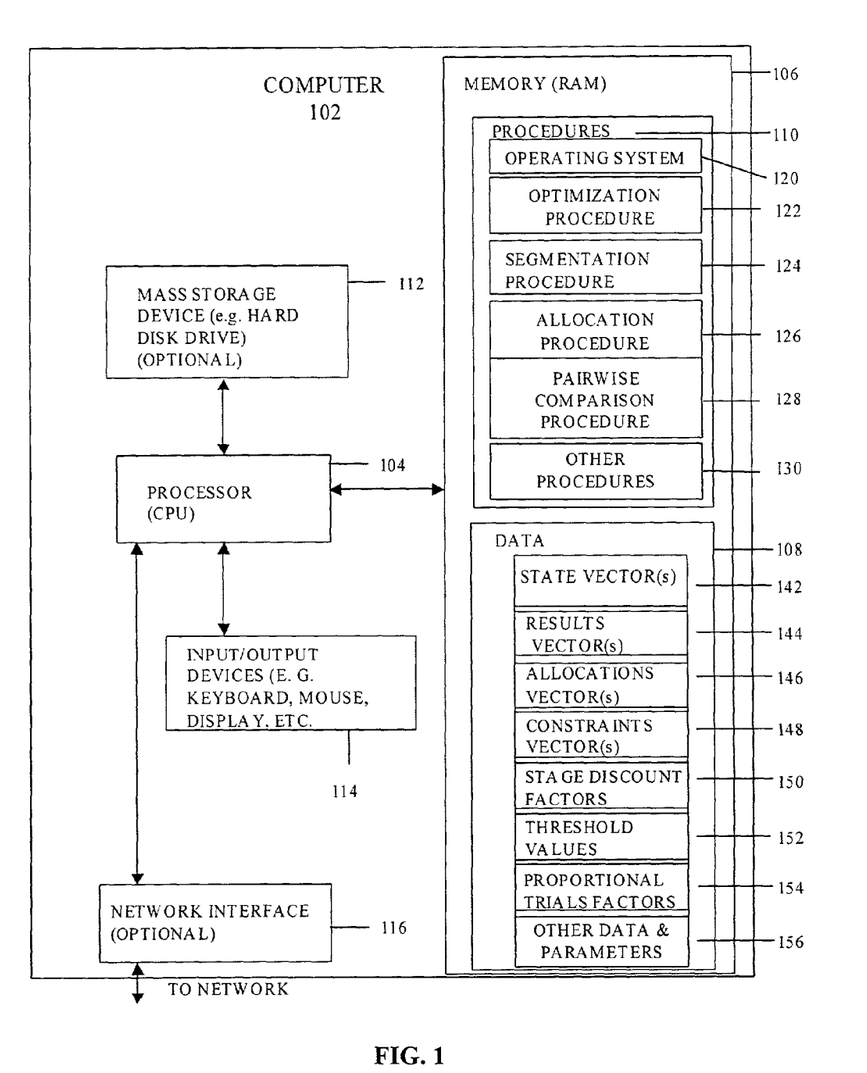
FIG. 1 shows an exemplary computer system that may be used in conjunction with the inventive methods, procedures, computer programs and computer program products, and algorithms.

With respect to FIG. 1, computer 102 includes a processor or CPU 104 coupled to a random access memory 106 storing data 108 and procedures 110. Random access memory (RAM) is desirable to facilitate computational efficiency and throughput. Processor 104 is also conveniently coupled to one or more mass storage device 112 such as one or more hard disk drives of which many types are known. The mass storage devices may typically store information in one or more databases. In the context of the present invention, such databases or data structures may store performance data, allocation data, and other data and/or procedures or algorithms that are not currently being processed by the processor 104 or memory 106. Input/output devices 114 may also be conveniently coupled to the processor or other computer system 102 components for inputting data to the computer, retrieving results from the computer, monitoring activity on the computer or on other network devices coupled to the computer, or other operations as are known in the art. A network interface 116, such as a network interface card (NIC), modem, or the like is also conveniently provided.

Procedures 110 may for example, include an operating system 120, an optimization procedure 122, a segmentation procedure 124, a message allocation procedure 126, a pairwise or other message alternative comparison procedure 128, as well as other procedures and algorithms 130.

Data 108 may for example include one or more state vector 142, results vector 144, allocations vector 146, constraints list or constraints items 148, stage discount factors or parameters 150, threshold values 152, proportional impressions or trials factors 154, or other data or parameters 156.

Those workers having ordinary skill in the art in light of the description provided here will appreciate that the computer system 102 described here is merely exemplary and that various modifications may be made, or that other computer system architectures may be used in conjunction with the inventive system, method, and computer program. Various types of personal computers (PCs), mainframe computers, work stations, and other computing and information processing systems are known in the art and may be used in conjunction with the inventive system architecture, methods, procedures, algorithms, and computer programs and computer program products.

Embodiment of Optimization Procedure and Algorithm

Having described certain high level features of the inventive optimization procedure as well as providing an exemplary environment in which the inventive methods, procedures, and algorithms have particular applicability, attention is now directed to details of a particular embodiment of the inventive optimization algorithm and procedure.

For an online banner ad campaign, the target population of an online banner ad advertising campaign includes and typically consists of "visitors". These visitors can be described in terms of a variety of visitor profile attributes. Examples of these attributes include the country that each visitor lives in, age of visitor, hour of day event occurred, day of week events occurred, operating system visitor is using, and other attributes either alone or more typically in some combination. Each attribute has one or more "values". For example, the hour-of-day attribute may take on any one of twenty-four values corresponding to each hour of the day. The country attribute has values equal to the countries where customers live, or in a practical implementation, the number of countries identified to users.

The values of an attribute can be decomposed into multiple portions. Each portion corresponds to one or more values or range of values of an attribute. For a single attribute each portion corresponds to a "cell". If we are studying two attributes then the combinations of values are called cells. For example Japan/1-2 am cell consists of all impressions that were shown to visitors from Japan (country attribute=Japan) between the hours of 1 am and 2 am (Hour attribute=1 am to 2 am). Each visitor from the target population falls into exactly one cell. It will be apparent to one skilled in the art in light of the description provided that zone can represent one of the visitor profile attributes and can be used as a targeting attribute.

In some cases, the data may be available for more than one template. Each template consists of multiple cells. The cells between different templates may not correspond to each other. All the cells of a template cover the entire set of visitors. For example, the attributes of template 1 may be "hour of day" and "country", and attributes of template 2 may be "hour of day" and "gender." The cells of one template (e.g., visitors from California between the hours of 1 pm and 2 pm), will generally be different then cells of the other template (e.g., all male visitors between the hours of 1 pm and 2 pm).

The customer population may be divided into one or more segments using a template. A segment of the visitor population for a particular template includes and typically consists of one or more cells.

The algorithm and procedure described below may be utilized for one or a plurality of attributes and/or templates but is described for a single attribute and a single template for ease of presentation. Extension to multiple attributes and multiple templates is described elsewhere in this description.

This embodiment of the algorithm and procedure is described in the Internet banner ad context. In this application context, three principal types of data are used by the inventive procedure for every cell: (i) State Vector, (ii) Results Vector, and (iii) Allocations Vector that includes a Constraints List. (In one embodiment, the Constraints List is separate from the Allocation Vector, but used to generate the Allocations Vector.) These data types are described in turn. The term vector is used to refer to one form in which the data is stored and/or manipulated.

Cell States and State Vector. For each combination of a cell and a banner, the inventive procedure retains a "state vector" that records all of the information that has been collected on the given banner at the given cell (cell/banner combination). This state vector is updated at the end of each stage of the campaign to reflect the results of that stage. In particular, the state vector contains the history of impressions and clickthroughs for the given cell and banner.

Results Vector. The results vector is a vector of the results of the most recent stage of the campaign. It contains the unprocessed impression and clickthrough data for each cell and banner combination. If a banner was not displayed at some cell during the most recent stage, the results vector indicates this fact.

Allocations Vector. The allocations vector contains the recommended allocation of banners to impressions for the next stage of the campaign. Intuitively, these allocations are expressed in percentage terms. However, in practice the recommended allocations may be re-expressed in a form acceptable to the ad server. Hence, some translation or transformation may be provided. The Allocations Vector may also include a list of constraints, though the constraints list may be separately provided.

Constraints List. A list of any constraints on the allocation of banners to impressions is stored in the constraints list. At least two types of constraints can occur. First, the user can specify the minimum number of banners that must be retained and displayed at each stage of the ad campaign. Second, the inventive procedure implemented as a computer program on a general-purpose computer retains a table of "banner exclusions." The table of exclusions, includes for example, a table defined as a data structure in memory that indicates when a given banner should not be shown on a given cell. This table may include one or more entries or may be empty.

The inventive procedure is advantageously run at the end of each stage of an ad campaign. It allocates the available banner impressions or banner ad alternatives at each cell for the next stage among the available banners. That is, it generates a strategy or recommendation for displaying banners during the next stage of the campaign. In developing this recommendation, the algorithm uses the results from all prior stages. (Though in at least one embodiment, a selected range of data from older stages may optionally be discarded, and in a different embodiment, not all data from all stages has the same weight or value in the recommendation.) One objective is to allocate the banners at all stages so that the total number of positive results, such as user clickthroughs on a web site, recorded at all cells by all banners during the campaign is maximized. Other operations may optionally be performed, for example, during the ad campaign, the client advertiser or marketing manager may wish to delete or add a zone or banner.

Figure 2:
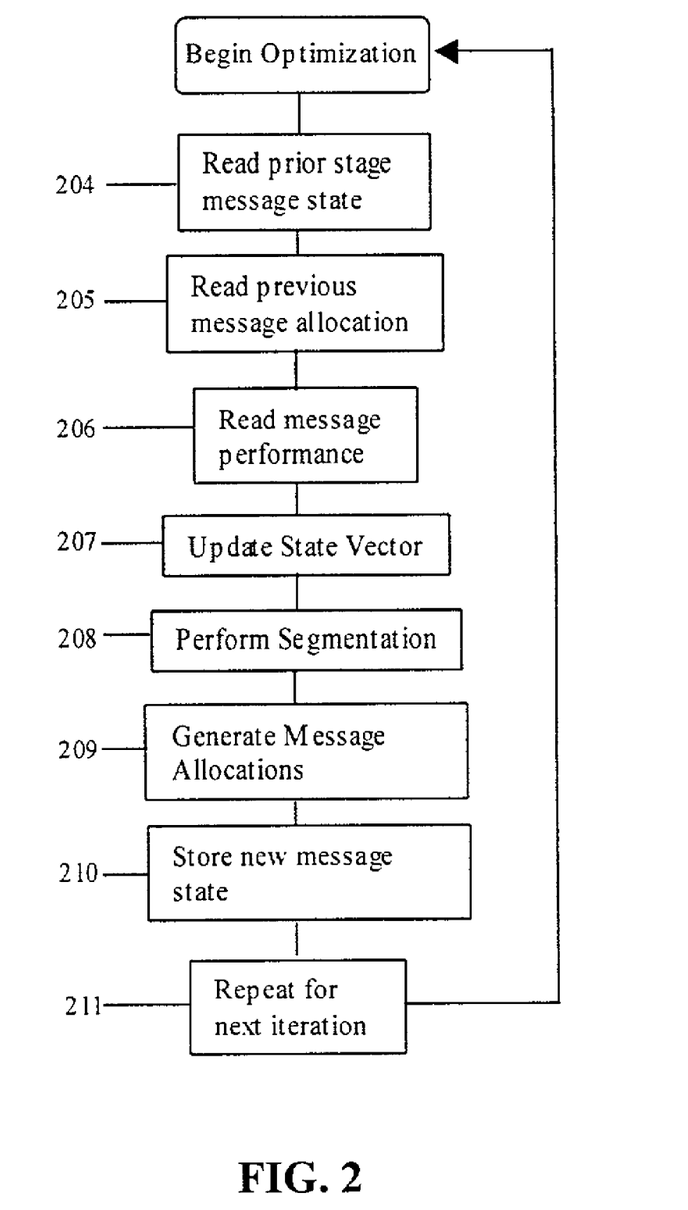
FIG. 2 is a flowchart that illustrates one embodiment of the optimization method, procedures, and algorithms.

An embodiment of the optimization procedure 202 is now described relative to the flow-chart diagram of FIG. 2. First, the prior stage message state is read (Step 204). Optionally, the previous message allocation, if available, is read. (Step 205). Next, message performance results are read (Step 206). These performance data or results are typically received from another source, such as an ad service and store. The current (or new) message state is then computed (Step 207) using, for example, the state vector update procedure described in greater detail elsewhere herein. The segmentation procedure is then applied to segment the cells into multiple segments (Step 208). Using these segments message allocations, possibly with some format transformation to adapt them to the particular foiniat needs of a receiver, are generated (Step 209) and sent to the receiver such as a message service. As a primary application of the inventive method is for Internet advertising, the message service will frequently be an ad service. As the message campaign (ad campaign) is generally a multi-stage campaign, the procedure is repeated until all stages in the campaign have been completed. This requires that the prior message state used in Step 204 be replaced with the current message stage (Step 210) generated in step 210 before the next iteration (Step 211). New message performance results received in step 206 are also used for the next iteration. The result of the current message allocation is optionally stored for the next iteration.

While it is generally intended that performance data or results are received for each prior stage before allocations are generated for the current or next stage in the campaign, and the inventive procedure benefits from such timely receipt, the invention does not require such timely receipt. In the event that expected prior stage results are not for some reason received as expected, the inventive procedures are sufficiently robust that the new allocations are merely based on the previous performance data or results. Therefore, when new performance results are not available, the old performance results are read or otherwise used in the computations. In some instances this may result in the same or substantially the same allocations as the previous stage, however, where discounting is applied, the allocations may not be the same. The extent of the difference may typically depend upon the discounting function and the historical prior performance results to which the discounting is applied.

The banner ad performance may improve or deteriorate over time so that generally the performance of an ad is non-stationary in a statistical sense. There are a number of potential reasons for a banner to have non-stationary behavior in the underlying performance. For example, a banner that promises overnight delivery may be quite effective shortly before Christmas, but much less effective on the day after Christmas. Even absent a particular identifiable event, the performance of ads may change over time. For example, Internet visitors may see a given banner too many times and beyond some point the banner loses all attraction. As the fraction of visitors who have seen the ad too many times increases the performance of the banner deteriorates.

Embodiment of State Vector Update Procedure

One embodiment of the inventive procedure optionally but advantageously uses a "discounting" of the performance data in computing or updating the State Vector. Such discounting may be in the form of a binary step function where data older than a certain stage is simply ignored, in the form of a linear or non-linear weighting function, or according to any other weighting or discounting scheme. In one embodiment, the discount is in the form of a geometrical discounting, that is, at the end of each stage all data (such as for example, the number of impressions and number of clickthroughs) is multiplied by a one-stage discount factor beta, $\beta$, where beta is a number less than one ($\beta<1$). Thus, data that is n stages old at the time when the procedure is executed will end up being multiplied by beta raised to the $n^{th}$ power ($\beta^n$). In this manner newer performance data is weighted more highly than older performance data. While not true in all circumstances, it is generally true that newer performance data provides better guidance as to what allocation scheme will be successful in the next stage than will older performance data. In any particular situation where this generalization does not hold true, different discounting schemes, including for example, a discounting scheme which weights some segment of performance data more heavily than newer performance data, may be applied. If no discounting is desired, beta may be set to 1 ($\beta=1$). (Empirical and simulation studies have shown that a value of the one-stage discount factor (beta) of about 0.9 works well for a range of synthetic and real data sets, though values between about 0 and about 1 may be used, more typically between about 0.5 and 0.99, more usually between about 0.8 and about 1.0, and even more usually between about 0.85 and 0.95 may be used.)

To describe the discounting procedures, let $s_i(t)$ denote the total number of discounted cumulative clicks and $n_i(t)$ denote the discounted cumulative number of impressions for banner i at the beginning of stage t for a given banner/cell combination i. Let $imp_i(t)$ denote the total number of impressions and $click_i(t)$ represent the total number of clicks and impressions for a particular banner/cell combination i in stage t. Then the discounted cumulative clicks $s_i(t)$ and the discounted cumulative impressions $n_i(t)$ are given by the following expressions:

$$s_i(t)=\beta s_i(t-1)+click_i(t-1), \text{ for } t>=2; \text{ and}$$

$$n_i(t)=\beta n_i(t-1)+imp_i(t-1), \text{ for } t>=2;$$

where $s_i(1)=0$ and $n_i(1)=0$. Thus, $s_i(t)$ and $n_i(t)$ represent two components of the state vector. Discounting reduces the impact of old data and allows the inventive algorithm to be more responsive to new data that may reflect changes in the clickthroughs rates or other performance indicators.

The above expressions are specialized for an embodiment in which the performance metrics are based on numbers of "impressions" and "clickthroughs," where for a particular impression the viewer has the binary choice of either clicking-though or not clicking through for each impression.

In the set of equations above, the discounting is provided by the factor 13. The above expressions can be easily generalized to an arbitrary or generalized discounting function $G\{\ldots\}$ which uses the clickthroughs and impressions from the previous stages to derive the discounted cumulative clicks $s_i(t)$ and the discounted cumulative impressions $n_i(t)$ using the following expressions:

$$s_i(t)=G\{click_i(1),\ldots,click_i(t-2),click_i(t-1)\},$$
$$\text{for } t>=2; \text{ and}$$

$$n_i(t)=G\{imp_i(1),\ldots,imp_i(t-2),imp_i(t-1)\}, \text{ for } t>=2;$$

where $s_i(1)=0$ and $n_i(1)=0$. In this generalized discounting function $G\{\ldots\}$, it is noted that none, some, or all, of the $click_i(t)$ and/or $imp_i(t)$ may actually weighted or discounted, though in the preferred embodiment each is discounted.

In particular, functions which give more weight to more recent values of $s_i$ and $n_i$ are of special interest. When a different binary response performance indicator than clickthroughs such as positive responses or "successes" is used, and a more general term applied to impressions such as "trials" is used, along with a generalized discounting function $H\{\ldots\}$, the general expressions for the total number of discounted successes $s_i(t)$ and the cumulative number of trials $n_i(t)$ are given by the following expressions:

$$s_i(t)=H\{success_i(1),\ldots,success_i(t-2),success_i(t-1)\},$$
$$\text{for } t>=2; \text{ and}$$

$$n_i(t)=H\{trial_i(1),\ldots,trial_i(t-1),trial_i(t-1)\},$$
$$\text{for } t>=2;$$

where $s_i(1)=0$ and $n_i(1)=0$. Here, $s_i(t)$ and $n_i(t)$ represent the state vector for banner/cell combination i. As noted above for $G\{\ldots\}$, none, some, or all, of the $success_i(t)$ and/or $trial_i(t)$ may actually be weighted or discounted by the discounting function $H\{\ldots\}$, though in the preferred embodiment each is discounted.

In some cases, before the inventive system and/or method are used for optimization, a campaign may already be executing. In this case, information may be available regarding the performance of the banners. This performance information can be used to initialize $s_i(1)$ and $n_i(1)$ as follows. A cumulative or discounting procedure as described in the previous section can be use to estimate $s_i(1)$ and $n_i(1)$ in the same fashion as $s_i(t)$ and $n_i(t)$ are calculated, for example, by either using the cumulative sum or some form of discounting. Those workers having ordinary skill in the art in light of the description provided here will appreciate that there are several similar variations of the above basic strategy.

Even when the campaign is started fresh, a campaign manager may have used the same banner in an earlier campaign or may have a prior judgement about the performance of the banner. In this case the value of $s_i(1)$ and $n_i(1)$ for banner/cell combination i can be set as follows. The manager can provide an estimate of the average performance of mean; for the banner/cell combination i over the previous campaigns. He/she may decide that the information from the previous campaign is worth $N_i$ impressions. In this case $s_i(1)$ can be set to $(mean_i \times N_i)$ and $n_i(1)$ can be set to $N_i$.

The setting of $s_i(1)$ and $n_i(1)$ as described above can be used to incorporate managers prior experience or judgement of the banners. Larger values of $N_i$ imply that the manager is more confident about extrapolating the future performance of the banner based on his prior experience or judgement.

Those workers having ordinary skill in the art in light of the description provided here will appreciate that there are several similar or analogous variations of the above basic strategy.

Embodiment of Segmentation Procedure

Having now described several embodiments of the state vector update procedure, attention is now directed to embodiments of the segmentation strategy and its associated procedure and algorithm. A segmentation strategy consists of decomposing all the cells into a set of segments such that each cell for a given template belongs to one of the segments.

During a campaign, attribute-specific data may be available for each banner. For example, not only are the total clicks and impressions available for each banner, but this data is also available at the attribute level for specific attributes, such as country attribute, hour of day attribute, operating system attribute, and/or other attributes. Optimizing banner allocation at the cell level should offer better performance than pooling all cells together for a given attribute, given sufficient impressions per stage. Thus, decisions can be made to show different banners to different countries, for example, according to the country attribute.

A problem with optimizing at the cell level is that we have fewer impressions than if one had optimized disregarding the cells of an attribute. This may lead to making poor allocations. One expects that grouping cells into segments in an intelligent way, and making allocation decisions for the segment as a whole, will lead to higher overall click-through rates. Every banner should have similar click-through rates across every cell in the segment. Thus, allocating impressions to the segment as a whole should be similar to separate cell allocation, but the former has more impressions, and hopefully will lead to better results.

The embodiment has general applicability, and thus the sites on which a banner is shown can be considered an attribute. In this case, each site from which a client has bought impressions can be considered a cell. Thus, one can explore whether it is better to pool information from different sites to improve overall performance. Assume that the underlying click-through rate of each banner for each cell is available for a given campaign. Also assume that the fraction of impressions assigned to each cell is known. This information can be used to quantify the benefit of optimizing each cell separately as opposed to grouping all the cells, assuming that the click-through rates are stationary. This quantity, called the gain ratio, can be obtained by the ratio of Stat2 divided by Stat1, where:

Stat1—The expected click-through rate given that all cells are grouped together, and the best banner was turned on the whole time, while others were turned off Stat2—The expected click-through rate given that all cells are treated separately, and the best banner for each cell was turned on the whole time, while others were turned off.

For most campaigns, if the gain ratio (Stat2/Stat1) is close to one, grouping all cells together into one segment as opposed to treating each cell separately will result in better performance. This is because optimizing at the cell level offers little performance gain, but fewer impressions for each allocation decision. (Note that this is only one example of a gain ratio and that other definitions of gain ratios or indicators may alternatively be used.)

For most cases, the gain ratio is close to 1. In these cases anything other than pooling all the cells together will typically deteriorate performance. However, in some cases the potential for improvement is large. The gain ratio is not necessarily known a priori, but if it were, or if it could be estimated well, this information may be used (as in some embodiments) to improve performance further.

One exemplary segmentation strategy comprises decomposing the visitor profile space into a set of segments, whose subsets unite to make up the entire visitor profile space. A Static Grouping Algorithm will always group all cells together into one segment, while a Static Splitting Algorithm will always split all cells into different segments so that each segment contains exactly one cell. If one is not careful about selecting the segmentation strategy, cells with different underlying click-through rates could be grouped together and may cause the allocation algorithm to make worse or poorer decisions than either grouping all cells together or alternatively treating all cells separately.

Let n be the number of cells. The number of possible segmentations for n cells is commonly known as a Bell Number, expressions for which are shown below:

$$B_n = \left\lceil e^{-1} \sum_{m=1}^{2n} \frac{m^n}{m!} \right\rceil, \quad B_n = \frac{1}{e} \sum_{k=0}^{\infty} \frac{k^n}{k!}.$$

The Bell Number, as a function of n, is much greater than $2^{n-1}$. The first ten Bell numbers are 1, 2, 5, 15, 52, 203, 877, 4140, 21147, and 115975. For reasonable values of n (occurring at around n>25), the number of possible segmentations grows rapidly. So one of the goals of a segmentation strategy is to reduce the total number of segmentations to be evaluated to derive a near optimal segmentation. This is required, or at least highly desired, because the number of possible segmentations is very large.

One primary goal of evolutionary targeting is to create a segmentation strategy at each stage, such that the expected performance of the campaign, given the present and past data, is maximized. In one embodiment, a segmentation method typically includes one or more iterations involving choosing a subset of segmentations and comparing these segmentations to find a current best segmentation. The former involves a method or procedure for choosing a subset of segmentations. This subset is different from previously chosen segmentations if more than one iteration is performed. The latter involves a method or procedure for comparing these segmentations to find the best current segmentation, where if the number of segmentations compared is equal to two this can be achieved by developing a method for comparing two segmentations. The above method is iterative in nature.

In another embodiment a recursive method can be used. This method starts with all the cells as a single segment. At every step of the recursion, the algorithm decides whether to split (or not split) a segment into two or more disjoint smaller segments. Splitting is deemed better if the weighted performance of the all the smaller segments is better than the entire segment.

Several embodiments for particular tests, comparisons, evaluations and decisions that address these issues are described immediately below.

Comparing Segmentations

In the following are described two different ways of comparing segmentations, performance-based comparisons and model-based comparisons.

1. Performance-Based Comparison These performance-based comparison methods directly estimate the expected performance of the segmentations to choose the better segmentation. This is generally a complex and non-trivial task as there typically exists considerable uncertainty about the underlying banner performance in or during the earlier stages. In one embodiment, the following measure may be used, given by θ, where θ is the largest value for which:

$$P(\text{click-through rate for at least one banner} > \theta) = 0.95$$

The value of θ is a surrogate for the expected performance if the allocation algorithm was applied to the segment. In one embodiment, the impression and click information from all the cells in the segment are pooled together for a given banner to derive its click-through rate.

The expected performance of a given segmentation is derived by the weighted average of θ for all the segments. This value can then be used to choose the best segmentation.

2. Model-Base Comparisons The goal of a model-based comparison is to determine a specific segmentation that models the underlying click-through rates well with the least number of segments. The allocation algorithm is then independently applied for each of the segments. The goal here is to find segments including or consisting of cells with similar click-through rates that will lead to an overall improvement in performance.

Two exemplary types of model-based comparison techniques are now described. The first technique involves a method that estimates a directed distance between a given distribution and the true underlying distribution of the clicks and impressions (Bernoulli trials). The second technique involves a method which compares models in a pair-wise manner and uses a hypothesis test. The second model-based method may sometimes be limited to cases when only two segmentations are two be compared to derive the better one between the two.

Akaike Information Criterion: The directed distance between two probability distribution functions can be defined as the Kullback-Leibler (KL) distance. Let f be the true distribution and g be the comparison distribution. Then the KL distance is defined by the expression:

$$KL(f,g) = E_f(\log(f/g))$$

where the expectation is taken with respect to the true distribution. It turns out, that an approximately unbiased estimator for the expected value of a version of the KL distance is the Akaike Information Criterion (AIC). (The Akaike Information Criterion is described, for example, in Kenneth P. Burnham and David R. Anderson, Model Selection and Inference, New York: Springer, 1998, incorporated herein by reference). The formula is as follows:

$$AIC(g) = -2\log(L(\theta|x)) + 2K$$

where θ is the maximum likelihood estimator of the parameter vector of the distribution g, x is an observation of the underlying random variable (the click and impression data in our situation), and L is the likelihood function of θ given the data, with K being the number of parameters in the distribution g (the size of the vector θ).

Thus, one can calculate the AIC for several different segmentations (models), and choose the smallest one as a segmentation strategy. Thus one would choose model 0 over model 1, if and only if:

$$-2\log(L_1) + 2K_1 - 2\log(L_0) + 2K_0$$

The likelihood function for the distribution associated with a given segmentation is easy to calculate (it is the joint distribution of several Bernoulli trials, evaluated at the given data point), so the AIC method of comparison is computationally feasible.

Given a random sample drawn from a Bernoulli distribution, the likelihood function takes the form of the expression:

$$L(p|x) = p^C(1-p)^{N-C}$$

where C is the number of clicks (successes), N is the number of impressions (trials), and p is the parameter (estimated click-through rate) of the likelihood function that is being minimized. As expected, the maximum likelihood estimate of p is simply the ratio of the number of successes divided by the number of trials or C/N. For a given segment (group of cells), the likelihood function can be calculated and evaluated at the estimate C/N, by summing up all clicks, summing up all impressions, and evaluating the function above, with the substitution p→C/N. The likelihood of the model is just the product of the likelihood functions of each segment. Also, the number of parameters for that model is the product of the number of segments and the number of banners.

Wilks' hypothesis test: If one defines Λ as $-2\log(L_0/L_1)$, then Λ has another interesting interpretation. Given $M_0$ is the null model with n parameters, and $M_1$ is the alternative model with m>n parameters, Λ takes on an approximate $\chi^2_{m-n}$ distribution, given the null hypothesis (that $M_0$ is true). Thus, using the AIC test is equivalent to the hypothesis test with p-value Prob{Λ>2(m-n)}. (A p-value is the probability that the alternative hypothesis is chosen, given the null hypothesis is true.) If the test is viewed from such a perspective, it is called a Likelihood Ratio Test (LRT). Usually, a p-value is fixed and threshold adjusted accordingly, depending on m-n. This is a matter of using the inverse cumulative distribution of $\chi^2_{m-n}$ to find the correct threshold for each m-n. Thus, one is left with two related methods of pair-wise segmentation comparisons.

Reducing the Number of Segmentations

In one embodiment, a so called greedy approach is used to reduce this search. This approach works recursively. At every step of the recursion, the algorithm decides whether to split a parent set into two children using the procedure, outlined immediately below and also illustrated diagrammatically in FIG. 3.

Figure 3:
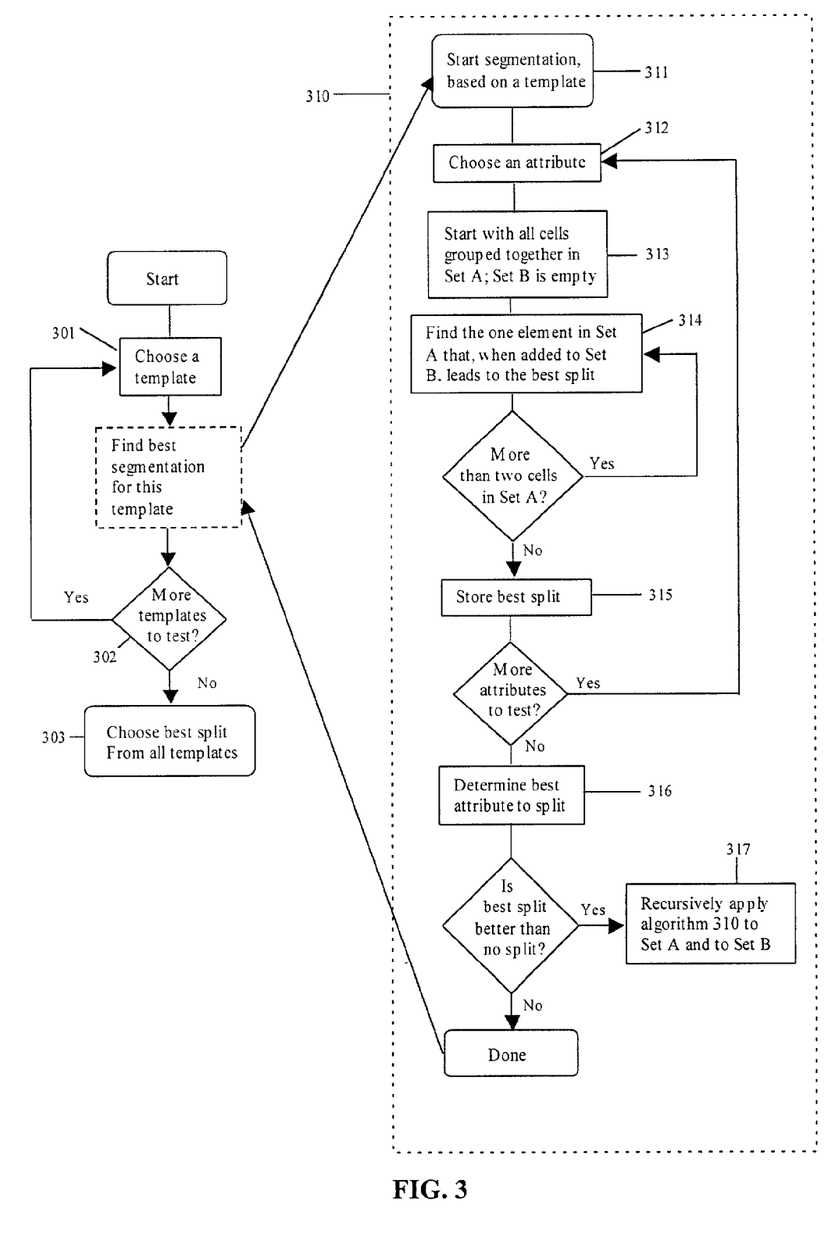
FIG. 3 is a flowchart that illustrates one embodiment of the segmentation method, procedures, and algorithms.

At step 311, begin with all cells grouped together (Set A). At step 314, find the one cell that, when split from the rest, leads to the best overall split value (either in terms of LRT or AIC as described above), and define set B to contain this one cell. Next, find the next best cell to remove from Set A and add to Set B (in terms of best split value amongst the choices). This is continued until there are only two cells left in Set A. At step 315, choose the split that gives the highest split value, of all combinations tried above. If a split is favorable (for example, B is non-empty) as compared to not splitting, the split is made, and the algorithm is recursively applied to each of the two children.

The above greedy algorithm is one of the possible approaches for finding a well-performing or the 'best' segmentation at each stage. One can extend this approach to do a random sampling of the entire segmentation space. Gibbs sampling methods may be used to stochastically select a better performing or something closer to the 'best' segmentation. Gibbs sampling methods are known in the art and not described in further detail here.

In another embodiment, an iterative segmentation method or procedure is applied. According to this procedure, at each iteration, a number of possible segmentations are determined, using Gibbs sampling or other methods or procedures. These segmentations are then compared using one of the methods described above. If two segmentations have been identified, the likelihood ratio test may be used; if two or more segmentations have been identified, performance-based measures or Akaike's Information Criterion may also be used. In particular, iterative implementations of the recursive method described above may be usefully employed to determine visitor segments.

The Case of Multiple Attributes

The algorithm and procedure described above can be readily extended to the case where one has data broken down by more than one attribute, including by more than one visitor profile attribute. For example, if one has click and impression data for "hour of day" and "state" (for example, the number of impressions and clicks for people in California between the hours of 1 pm and 2 pm), the algorithm can determine segments defined on both the "hour of day" and "state" attributes.

The multi-attribute algorithm works in a very similar way to the single-attribute algorithm that has been described in detail herein elsewhere. In particular, in one embodiment, the multi-attribute algorithm applies the greedy algorithm to each attribute independently and determines candidate splits for each attribute. It then chooses the split that is the best across all attributes (or alternatively across some selected set of attributes), implements that split, and then continues by recursively trying to split each of the children, again generating potential splits across all (or selected) dimensions and choosing the best one. The following description for a multi-attribute implementation provides a more detailed description of the steps involved, aspects of which are also illustrated in FIG. 3:

At Step 312, the supercells along a given attribute include or consist of all the cells with the same value of the attribute. In one embodiment, the performance information of a supercell is derived by pooling all the cells corresponding to a supercell. The following substeps (Steps 313-315) are applied along each attribute and the attribute and split which results in the best segmentation are identified. At Step, 313, begin with all supercells grouped together (Set A). At Step 314, find the one supercell that, when split from the rest, leads to the best overall segmentation, and define Set B to contain this one supercell; then, find the next best supercell to remove from Set A and add to Set B (in terms of best split value amongst the choices). Continue, until all there are only two supercells left in Set A. At Step 315, choose the split that gives the highest split value, of all combinations tried above. At Step 316, if a split leads to a favorable segmentation as compared to not making a segmentation split, then the split is made along the corresponding attribute, and the algorithm is recursively applied (Step 317) to each of the two children.

Those workers having ordinary skill in the art will appreciate that the above described techniques and procedures represent exemplary ways for splitting cells, and that other variations on these techniques or different alternative techniques may be employed.

The Case of Multiple Templates

The algorithm and procedure described above can be readily extended to the case where one has data that is broken down by more than one visitor profile template. The algorithm assumes that data is collected for all the cells of each template. For example, one may have click and impression data for a plurality of attributes such as "hour of day" and "state" (for example, the number of impressions and clicks for people in California between the hours of 1 pm and 2 pm), and separately for "hour of day" and "gender" (for example, the number of impressions and clicks for all males between the hours of 1 pm and 2 pm). In such cases, one may readily extend the model-fitting techniques to automatically let the algorithm choose which template is best to segment. At the end of a few stages the gain ratio (or other measure) along each (or selected ones) of the templates is estimated by modeling the performance of the best segmentation of the template. The template with the best-estimated gain ratio is then used for segmentation for the rest of the campaign. Those workers with ordinary skill in the art will appreciate that the template used for segmentation can also change from stage to stage.

Using Prior Segmentation Information

If it is known that certain cells belong together, based for example on data mining of historical data, any other problem or situation specific information or criteria, or other information no matter what the source, then it may generally be desirable for the algorithm to compare the evolutionary targeting algorithm segmentation with a specified segmentation, and choose which has the most potential. Bayesian methods for example, can be used to give preference to the prior segmentation, and are used in one embodiment.

Using Skeleton Segments

A marketer (or other messaging entity) may desire to have certain skeleton segments. This requires that the segmentation strategy ensure that each segment created is a proper subset of one of the skeleton segments provided by the marketer. Embodiments of the inventive algorithm can be easily changed to work within such a constraint, segmenting within each skeleton segment.

Allocation Within a Cell

The clicks and impression information for each cell within a segment may advantageously be added together to derive the "pooled clicks" and "pooled impressions" information for each cell in the segment. This information is then used for making allocations for each cell.

At the initial stage (when no information has been collected on the banner ads or other message type), embodiments of the inventive method and procedure may allocate the impressions in any one of several possible manners. Such initial allocation may be based on either objective or subjective criteria, or on a combination of both. In one embodiment, an even or uniform initial allocation of impressions is made from among the available banners (or other message type). That is, if there are a number b banners, then each banner will receive a proportional fraction 1/b of the total number of impressions for each cell.

At each of the remaining stages, the inventive procedure may then use the available performance data (for example, the pooled impressions and pooled click throughs from the earlier stages), allocation information, and/or other information that may be available on the banners to divide the available banners into two classes: (i) a first group referred to as the contenders, and (ii) a second group referred to as the non-contenders. The "contenders" are the banners that are still in contention according to some criteria to be declared the best banner. The "non-contenders" are the banners that appear out of the running for best banner based on the available information. There may also be a (iii) third group of "unavailable banners" if the constraint list indicates that some banners cannot be used on the given zone during a particular stage. Banners that cannot be used for the next stage during which the new allocations are to be made would be placed in the third group, as they cannot be displayed during the next stage independent of how well they might perform. Hence, those ads that are available for the next stage are divided into either the contender or the non-contender group. Any one of these groups may have none, one, or a plurality of ads. These concepts and procedures of course apply in analogous manner to message types other than ads or banner ads. Given this division of the banners into contenders and non-contenders, one embodiment of the inventive procedure allocates the impressions among the banners as follows. Let $\gamma<1$ be a constant that represents the proportion of impressions that will be allocated to the non-contenders at each stage. This $\gamma$ is a constant selected at the beginning of the campaign. The value selected is not critical, as the inventive procedure will reallocate between contenders and non-contenders at subsequent stages. The value may also be selected so that impressions are not allocated to non-contenders. Let b represent the total number of banners, $b_1$ denote the number of contenders and $b_2=b-b_1$ the number of non-contenders. Then each contender receives the fraction $(1-\gamma)/b_1$ of the available impressions, while each non-contender receives the fraction $\gamma/b_2$ of the available impressions. Using this approach with a small value of $\gamma$, most of the impressions are spread evenly among the contenders and a few impressions are used to continue monitoring the non-contenders. As the campaign progresses the number of contenders will generally decrease over time since the inventive system and method will have more information upon which to judge which banners are more successful and which banners are less successful.

In an allocation task where there are five possible banners $\{X_1, X_2, X_3, X_4, X_5\}$, three of which are contenders $\{X_1, X_2, X_3\}$ and two of which are non-contenders $\{X_4, X_5\}$, the Allocation Vector may therefore take the form of, for example (0.3, 0.3, 0.3, 0.05, 0.05) where the contenders each have a 0.3 (or 30%) and the non-contenders each have a 0.05 (or 5%) proportion of the total.

Exemplary Pair-Wise Test Procedure to Identify Contenders and Non-Contenders

In one embodiment, the division of banner ads into contenders and non-contenders is based on the following pair-wise test procedure for comparing two banners. When more than two banners are involved in a campaign a pair-wise test is advantageously used for each possible pair or combination of banners.

For each pair-wise test, suppose that two banners are given and let $p_i$ (for i=1, 2) denote the unknown clickthrough probability of the $i^{th}$ banner. Let $n_i$ denote the total number of pooled impressions for the $i^{th}$ banner, $s_i$ the total number of pooled successes and $f_i$ the total number of pooled failures. (So, $s_i+f_i=n_i$). Finally, define Z and V as follows:

$$Z=(n_2 s_1-n_1 s_2)/(n_1+n_2), \text{ and}$$

$$V=(n_1 n_2 (s_1+s_2)(f_1 f_2)/(n_1+n_2)^3.$$

It can be shown that Z is approximately normally distributed with variance V and mean $\theta V$, where:

$$\theta=\log((p_1(1-p_2))/(p_2(1-p_1))).$$

The pairwise test attempts to determine or test whether the two unknown clickthrough rates for the two banners under consideration are equal. If they are equal, then $\theta=0$ and Z is normally distributed with mean 0 and variance V. The distance between the observed value of Z and 0 (the mean of its distribution) measured in standard deviations is given by Z divided by the square root of V. In one embodiment, if this statistic $(Z/\sqrt{V})$ is greater (in absolute value) than some cutoff threshold value $\Upsilon$, then the procedure concludes that the click-through (or other performance indicia) rates are significantly different from each other. In one embodiment, the user (such as for example the marketing manager) specifies the cutoff threshold value $\Upsilon$ prior to the campaign; however, the value may be modified during the campaign. In one embodiment, the value of the cutoff threshold value $\Upsilon$ is selected to be between about ½ and about 1, based on empirical simulation results, but other values may be used. In one embodiment a cutoff threshold value $\Upsilon$ of 0.5 is used. Other embodiments use different values. Particular values used in specific situation may be determined from experience or empirically with these values as a guide.

The pairwise test is applied to all pairs of banners. If a particular banner loses one of these comparisons (that is, if a banner is determined to have a significantly lower click-through rate than another banner), then that banner is designated as a non-contender. This pairwise procedure guarantees that at least one contender will remain.

Exemplary Procedure For More Than Two Sets of Alternatives

The algorithm described above divides the alternatives into two sets: contenders and non-contenders. The basic approach can be extended to decompose the alternatives into more than two sets. Consider the pair-wise test between alternative i and alternative j. Let Compare(i,j) represent the $Z(i,j)/\text{sqrt}(V(i,j))$ statistic where:

$$Z(i,j)=(n_j s_i - n_i s_j)/(n_i+n_j), \text{ and}$$

$$V(i,j)=(n_i n_j (s_i+s_j)(f_i+f_j)/(n_i+n_j)^3.$$

The value of Compare(i,j) is positive if the performance of alternative i is better than alternative j and is negative if the performance of banner j is better than banner alternative i. Define Perf(k)=$\max_{1 \leq i \leq n}$ Compare(i,k). This embodiment of the algorithm or procedure deems an alternative k to be a non-contender if performance of alterntive k, that is if Perf(k), is above the cutoff threshold, otherwise k is a contender.

The above basic approach can be extended to decompose the alternatives into more than two sets. Under these circumstances, the alternatives are divided into several sets based on the corresponding Perf values. The impressions are allocated to different alternatives such that the alternatives for sets corresponding to higher values of Perf get smaller numbers of impressions. However, the number of impressions allocated to all alternatives within a set is equal. In the extreme case, the number of sets is equal to the number of alternatives. In this case, each alternative gets a different fraction of the total number of impressions (or trials). This approach is formalized in the next section.

Exemplary Procedure for Dividing Alternatives into Multiple Sets

The value of Compare(i,j) is positive if the performance of alternative i is better than alternative j, and the value of Compare(i,j) is negative if the performance of banner j is better than banner alternative i. Define a performance function (Perf (k)) to be the maximum of Compare(i,k) over the range of i from i=1, . . . , n; that is, Perf(k)=$\max_{1 \leq i \leq n}$ Compare(i,k). The algorithm deems an alternative k to be a non-contender if Perf(k) is above the cutoff threshold $\alpha$, otherwise k is deemed to be a contender.

One embodiment uses the value of Perf(k) to segment the banners into two or more sets (r>2 sets). In this context, larger values of the performance function Perf(k) as defined here will generally imply poor relative performance of banner alternative k. Let there be user defined thresholds $\alpha_1, \alpha_2, \ldots \alpha_{(r-1)}$ such that a first threshold $\alpha_0=-\infty$, and the remaining thresholds are each greater than $a_0$, that is $-\infty=\alpha_0<\alpha_1<\alpha_2<\ldots<\alpha_{(r-1)}<\alpha_r\infty$. The algorithm assigns a banner k to set j, where $1 \leq j \leq r$, if $\alpha_{(j-1)} \leq \text{Perf}(k) << \alpha_j$.

The impressions are allocated to different alternatives such that the alternatives for sets corresponding to higher values of Perf get smaller fraction of impressions. However, the number of impressions allocated to all alternatives within a set is equal. In the extreme case, the number of sets is equal to the number of alternatives. In this case, each alternative gets a different fraction of the total number of impressions (or more generally, total number of trials).

Those workers having ordinary skill in the art in light of the description provided here will appreciate that there are several similar variations of the above basic strategy that can use the Compare function to segment the banner into multiple sets.

One embodiment of the allocation algorithm is as follows. Define constant $prop_1, prop_2, prop_3, \ldots, prop_r$, such that $prop_1 \geq prop_2 \geq prop_3 \ldots prop_r$. $Prop_j$ represents the proportion of total impressions assigned to all the banners belonging to set j, where $1 \leq j \leq r$. Let the number of banners belonging to set j be given by $num_j$, where $1 \leq j \leq r$. (Note that the Sum of $num_j$=total number of banners). Then a banner belonging to set i is assigned the fraction of total impressions=$Prop_i/\{\Sigma_{1 \leq j \leq r}(num_j \times prop_j)\}$.

Unlike the allocation strategy for two sets, the above allocation does not guarantee a fixed fraction of impressions to be allocated to relatively under-performing sets. However, it guarantees that banners belonging to relatively poor performing sets get smaller number of impressions as compared to relatively higher performing sets.

Those workers having ordinary skill in the art in light of the description provided here will appreciate that there are several similar variations of the above basic strategy using the Z and V statistics for the pair-wise comparisons which can be used for decomposing the alternatives into two or more sets.

Exemplary Simulation Experiments and Results

A suite of simulations on synthetic data were conducted to further verify and quantify the impact of different parameters for a large range of number of banners, number of targeting cells and impressions per day. Simulations of three types of data sets were conducted: "grouping is best" data sets, "grouping is bad" data sets, and hybrid combinations of these two.

The "grouping is best" data sets were generated so that the banners' click-through rates were identical across all cells, and in this case for the simulation data set grouping cells is the best strategy. For the "grouping is bad" data sets, the click-through rates were generated so that each cell had a potentially different best banner. In these cases, optimizing for each cell separately showed to be the best strategy. Finally, in the hybrid data sets, it was not clear a priori with the data used whether grouping is good or bad.

Simulations on data collected from fifteen buy campaigns were also conducted. The duration of each buy campaign was between two and four weeks, and the following attributes were considered: country, browser, state, operating system, hour of the day, and service provider. Several conclusions were drawn from these simulations. One result shows that the model-comparison-based algorithms performed slightly better than the performance-based algorithms. The model-comparison-based algorithms were also computationally less intensive. When the number of impressions per day is large (data rich cases), the evolutionary targeting algorithm performed close to the better of the two static algorithms for nearly all the data sets. On rare occasions, the targeting algorithm beat both algorithms or performed worse than both algorithms. On the other hand, when the number of impressions per day is small (data sparse cases), the evolutionary targeting algorithm out performed the worse of the two static alternatives, and showed comparable performance to the better of the two static algorithms for nearly all the data sets. On rare occasions, the evolutionary targeting algorithm beat both algorithms or performed worse than both algorithms. For a given targeting variable, if it is known that grouping or splitting is preferable, using evolutionary targeting will generally reduce performance. However, evolutionary targeting is an excellent compromise when it is not known whether splitting or grouping is preferable. In the simulation, trying all possible segmentations at each level of the recursion did not give a substantial improvement of results for the evolutionary targeting algorithm.

The results of simulation also showed that the targeting algorithm is more robust than the alternatives, while sacrificing some performance over the winner. Thus, embodiments of the inventive procedure and algorithm provide a good way to adapt to the situation, since it gives good performance, with a lower variance than the static alternatives. Buys with gain ratio statistics close to one (1.0) show that the targeting algorithm has marginal, if any performance improvement, as expected. In some cases, the targeting algorithm out-performed both alternatives.

Visualizing the Performance Variation

Figure 5:
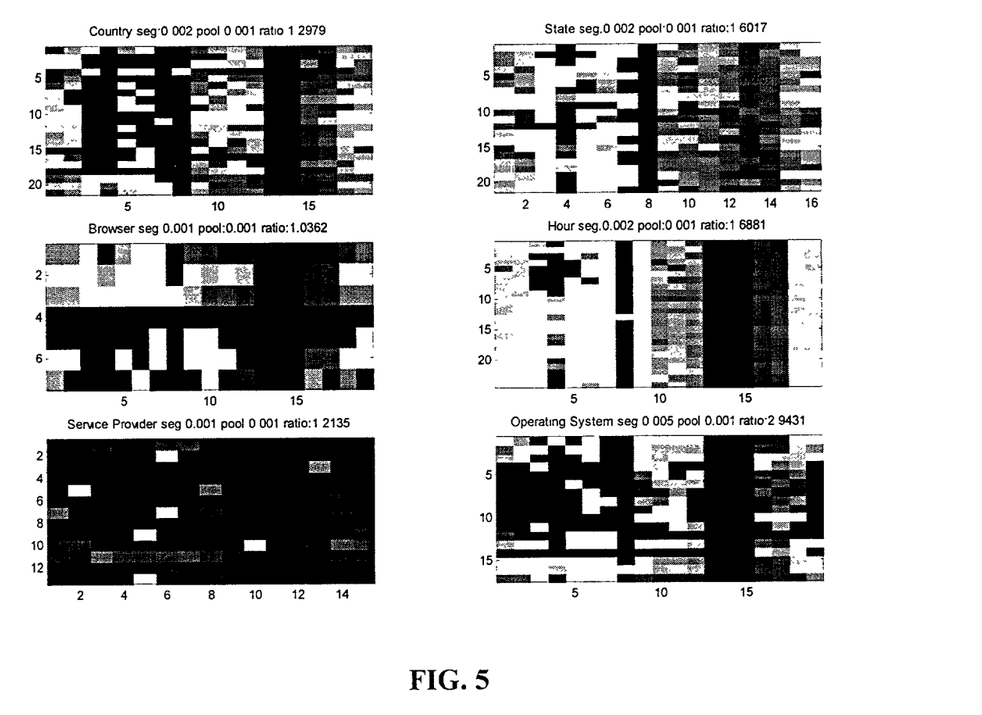
FIG. 5 is a diagrammatic illustration showing an exemplary way of visualizing the performance variation of banners for different segments of the population.
Figure 6:
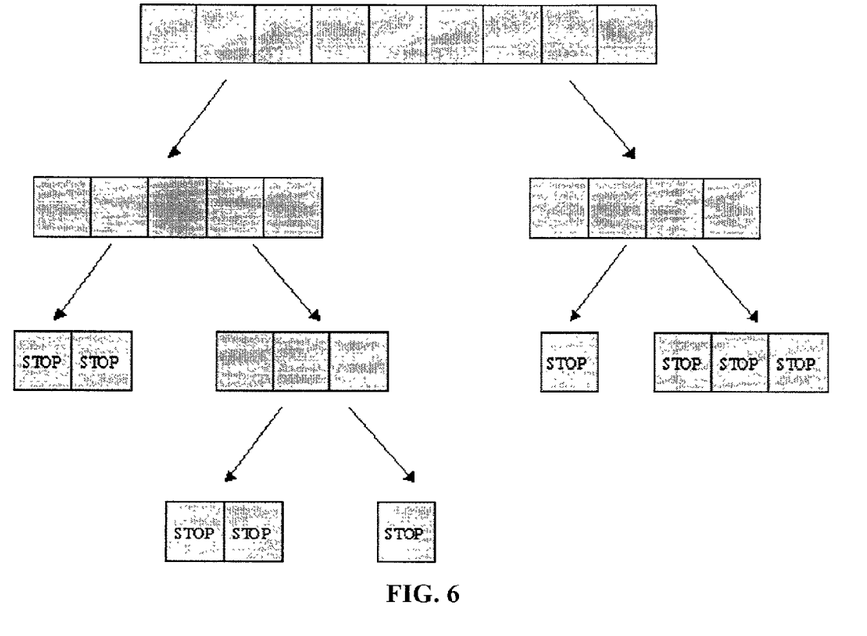
FIG. 6 is a diagrammatic illustration showing one embodiment of a recursive-division approach for deriving high-performing segmentations according to the invention.

An image plot was generated for each of the six attributes in all buy campaigns. Referring to FIG. 5, the x-axis distinguishes between banners, while the y-axis distinguishes between cells. The click-through rate matrix thus consists of numbers between zero and one, and this matrix was scaled and shifted to give values between one and one hundred. This matrix was then plotted, where each banner-cell was given corresponding gray scale intensity or level of shading. Hence, vertical bands that vary greatly in intensity (within the band) indicate that the click-through rates of the associated banner vary over cells. The intensity plots give some evidence that segmentation is a good idea for some attributes. As described, there is significant variance of intensity along vertical strips. The higher the gain ratio statistic, the more variance of intensity across cells.

Additional and Alternative Embodiments

It can therefore be seen from the above description that the inventive system and method provide particularly advantageous benefits in the banner ad messaging context. As suggested throughout the description, the overall methodology as well as the procedures and algorithms may be applied and extended to messaging situations and contexts other than Internet banner advertising.

Electronic Mail

Email is an important medium for advertising and marketing. Many businesses now readily use email to acquire new customers, build brands, advertise and promote products, measure consumer satisfaction and manage customer relationships. A typical email campaign involves sending emails to each address on a list of recipients. The list may typically be bought or otherwise acquired from an outside firm or collected internally over a period of time. The procedures and algorithms developed above can be easily extended for optimizing the responses generated by emails. A system and method for improving the performance of Emails is described in U.S. patent application Ser. No. 09/586,394, filed Jun. 2, 2000 and entitled Optimizing The Performance of Email and Other Message Campaigns, which is hereby incorporated by reference.

Among the various alternative messaging situations, the inventive method, procedures and algorithms may, for example, be extended to the email environment by decomposing the email process into multiple stages. In each stage a fraction of the total emails to be sent out to each alternative is given by the allocation algorithm described above. The major difference in an email application as compared to the afore described banner ad application is that there is typically a non-uniform delay between the time an email is sent out and the time a response is received. (For banner ads this delay is either non-existent for practical purposes or fairly uniform, for example the delay for a banner ad clickthrough may be between about 1 second and 60 seconds, well within one stage.) However, one can measure the total number of responses received for a given email alternative by the end of a given stage and the total number of emails sent for that alternative as a way of measuring the performance of a given alternative. This information can then be used by the algorithm to determine and allocate the better performing alternatives and optimize the total number of responses over the entire campaign. The duration of the stage should advantageously be chosen to ensure that a reasonable fraction of overall responses are received by the end of each stage and the number of stages are large enough that the algorithm can learn the better performing alternatives in the earlier stages and exploit this information in later stages.

Each of the inventive methods, algorithms, and procedures may be implemented as a computer program, also referred to as software or firmware, programs or code, on a general purpose or specialized computer. Such computers routinely include a processor or CPU, a fast random access memory coupled to the processor in which is defined a data structure storing program procedures and data associated with executing the programs or procedures in the processor. Such procedures include the inventive state vector update, pair-wise comparison, and allocation procedures, among other procedures described herein. An operating system is also typically provided. When implemented as a computer program or software or firmware, the invention also includes the program, software, and/or firmware in addition to a computer program product. Such computer program product may tangibly embody the computer program on a machine readable medium such as a magnetic disc, CD-ROM, DVD, memory card, compact flash, Sony memory stick, or any other media, or be stored and communicated electronically. For example, the inventive computer program may be communicated electronically or optically over a communication link, such as for example over the Internet.

It will also be clear in light of the description provided herein, that the various procedures and algorithms described herein may be used separately or in any combination.

The foregoing description, for purposes of explanation, used specific nomenclature to provide a thorough understanding of the invention. However, it will be apparent to one skilled in the art in light of the description provided that the specific details are not required in order to practice the invention. Thus, the foregoing descriptions of specific embodiments of the present invention are presented for purposes of illustration and description. They are not intended to be exhaustive or to limit the invention to the precise forms disclosed. Obviously many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

It is intended that the scope of the invention be defined by the following claims and their equivalents. All patents, publication, or other references referred to herein are hereby incorporated by reference.

We claim:

1. Apparatus, comprising:
   a processor;
   a computer memory holding computer program instructions which when executed by the processor comprise:
      an optimization process programmed to receive message performance information and to generate recommended message allocations;
      a segmentation process programmed to segment a target visitor population into a set of segments using one or more templates each comprising one or more cells, wherein the target visitor population comprises visitors defined by a set of visitor profile attributes, each visitor profile attribute comprising one or more portions, each portion corresponding to one or more values or range of values of an attribute, wherein values associated with one or more attributes corresponds to a cell, and the set of segments, collectively, comprise the target visitor population, wherein the segmentation process uses an algorithm to identify a segmentation by determining, recursively, beginning with a single segment that includes all of the set of segments representing the target visitor population, and continuing for each new segment resulting from a split until no new segments are produced, whether to split a segment into two or more disjoint smaller segments based on whether a weighted performance of the two or more disjoint smaller segments is better than that of the segment; and
   an allocation process programmed to receive the recommended message allocations from the optimization process and to receive the set of segments from the segmentation process and, in response, generating message allocations.

2. The apparatus as described in claim 1 wherein the algorithm is a greedy algorithm.

3. The apparatus as described in claim 1 wherein visitors are classified by demographic or psychographic information along a number of attributes.

4. The apparatus as described in claim 1 wherein the segmentation process compares the set of possible segmentations to determine which segmentation will lead to a desired visitor response.

5. The apparatus as described in claim 1 wherein the segmentation process divides visitors into segments based on the performance of different messages for different visitors.

* * * * *